Patented Oct. 28, 1952

2,615,866

UNITED STATES PATENT OFFICE 2,615,866

COPOLYMERS OF VINYLIDENE CYANIDE WITH VINYL ESTERS

Harry Gilbert, Cuyahoga Falls, and Floyd F. Miller, Akron, Ohio, assignors to The B. F. Goodrich Company, New York, N. Y., a corporation of New York No Drawing. Application September 13, 1949, Serial No. 115,562

8 Claims. (Cl. 260—78.5)

This invention relates to the preparation of novel copolymers of vinylidene cyanide with vinyl esters of aliphatic monocarboxylic acids, which copolymers are extremely useful in the preparation of filaments and films.

In U. S. Patent 2,476,270, to Alan E. Ardis, and in copending applications, Serial No. 63,434, filed December 3, 1948, now U. S. Patent 2,502,412, and Serial No. 79,712, filed March 4, 1949, now U. S. Patent 2,514,387 novel methods for the preparation of monomeric vinylidene cyanide are disclosed. In another copending application, Serial No. 11,336, filed February 26, 1948, methods for the preparation of useful homopolymers of vinylidene cyanide are disclosed.

U. S. Patent 2,466,395 to Joseph B. Dickey, mentions and purports to describe copolymers of methylene malononitrile (an alternative nomenclature for vinylidene cyanide) with certain other monomers, such as vinyl acetate, vinyl ethers, butadienes, and other vinyl and vinylidene compounds. However, Dickey was definitely in error in designating his materials as copolymers of methylene malononitrile, since the properties of the monomeric material accurately and authentically described as methylene malononitrile or vinylidene cyanide are such that it could not copolymerize with the various monomers in the manner described in the Dickey patent. For example, authentic monomeric vinylidene cyanide polymerizes spontaneously in the presence of a number of materials such as water, alcohols, and alkaline materials. Accordingly, authentic monomeric vinylidene cyanide does not copolymerize with butadiene-1,3 in an aqueous emulsion in the manner set forth in Example 3 of the Dickey patent. Rather when the authentic monomer is used according to the example all of the vinylidene cyanide polymerizes immediately upon contact with the water, and consequently no copolymer of vinylidene cyanide with butadiene-1,3 is obtained. Also, as will be seen hereinafter, the copolymers of authentic monomeric vinylidene cyanide with vinyl acetate are completely insoluble in acetic acid, whereas the product erroneously designated by Dickey as such a copolymer is described in his Example 1 as being dissolved in acetic acid. Furthermore, the only possible method of preparation of monomeric vinylidene cyanide referred to at all in the Dickey patent is that described in Chemische Zentralblatt I, 613 (1921) which involves the reaction of formalin solution with malononitrile in aqueous alkaline solution. It has been found, however, that this method does not give monomeric vinylidene cyanide but rather results in the production of an entirely different product melting far above the melting point of authentic monomeric vinylidene cyanide, in fact, at a temperature in excess of 200° C.

We have discovered, that when authentic monomeric vinylidene cyanide, a clear liquid at room temperature and a white solid at 0° C. obtainable by the methods hereinabove referred to (and when in purest form having the following physical properties: M. P. 9.0°–9.7° C.; B. P. 40° C./5 mm.; $d_4^{23}=0.992$; $N_d^{20}=1.4411$), is copolymerized with a vinyl ester of an aliphatic monocarboxylic acid in a manner such that the charge contains from 1 to 90 mole percent of vinylidene cyanide and in the presence of a free radical polymerization catalyst, new and highly useful copolymers are obtained. These copolymers are essentially 1:1 alternating copolymers, that is, copolymers possessing the structure:

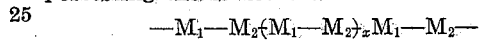

wherein each $M_1$ is a vinylidene cyanide unit

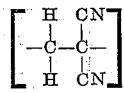

and each $M_2$ is a unit of a vinyl ester of an aliphatic monocarboxylic acid

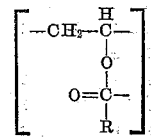

and $x$ is any number, preferably from 150 to to 20,000. The fact that the copolymers thus obtained are essentially 1:1 alternating copolymers is determined by analysis of the copolymer and by the following copolymerization equation of F. M. Lewis, C. Walling, et al., Journal of the American Chemical Society, 70, 1519 (1948):

$$\frac{d(M_1)}{d(M_2)} = \frac{(M_1)}{(M_2)} \cdot \frac{r_1(M_1)+(M_2)}{r_2(M_2)+(M_1)}$$

wherein ($M_1$) = concentration of unreacted monomer $M_1$
($M_2$) = concentration of unreacted monomer $M_2$
$r_1$ = ratio of the rate constants for the reaction of an $M_1$ type radical with $M_1$ and $M_2$ respectively.
$r_2$ = ratio of the rate constants for the reaction of an $M_2$ type radical with $M_2$ and $M_1$ respectively.

When the product of $r_1.r_2$ (the values of $r_1$ and $r_2$ being determined by solving the equation for $r_1$ and $r_2$) is equivalent to zero, a 1:1 alternating copolymer is formed, that is, a copolymer having the

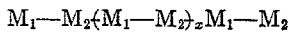

structure shown hereinabove for the copolymers of vinylidene cyanide with vinyl esters of aliphatic monocarboxylic acids. That these copolymers possess the 1:1 alternating structure is demonstrated by the fact that when $M_1$ is vinylidene cyanide, and $M_2$ is vinyl acetate $r_1 = 0.026$ and $r_2 = 0.0026$; therefore the product of $r_1$ and $r_2$ is 0.0000676, which is, of course, substantially equivalent to zero.

It is highly surprising that vinylidene cyanide will polymerize with vinyl esters of aliphatic monocarboxylic acids to give the 1:1 alternating copolymers, since almost without exception monomer pairs exhibit a very strong tendency to polymerize randomly rather than to form the alternating type copolymer of this invention, this being especially true of vinylidene and vinyl compounds. In fact, it has heretofore been believed that in order to give an alternating copolymer it is necessary that the system contain at least one monomer that does not polymerize by itself to give a high molecular weight polymer.

Thus, it is all the more surprising that vinylidene cyanide and vinyl esters, both of which polymerize readily by themselves, form the 1:1 alternating type copolymer.

Any vinyl ester of an aliphatic monocarboxylic acid may be polymerized with vinylidene cyanide to give the alternating copolymers in accordance with this invention. Preferably, however, vinyl esters of aliphatic monocarboxylic acids of the formula RCOOH, wherein R is an alkyl radical containing from 1 to 6 carbon atoms, are utilized. Included within this class of esters are vinyl acetate, vinyl propionate, vinyl butyrate, vinyl isobutyrate, vinyl valerate, vinyl caproate, vinyl enanthate, and the like.

The polymerization itself may be carried out in several different ways. One preferred method consists in first dissolving the vinylidene cyanide and the vinyl ester in benzene or other aromatic solvent such as toluene, methyl toluene, trichloro benzene, or the like, preferably free from impurities which initiate the ionic polymerization of the monomer, and in an amount such that the solvent comprises approximately 30 to 80% by weight of the total solution. A polymerization catalyst is included in this solution and the resulting mixture is heated to a temperature of about 30° C. to 80° C. whereupon polymerization occurs to form the desired copolymer as a white powder of small particle size. The copolymer thus formed may be separated from the polymerization medium simply by filtering, or if desired the polymerization medium may be removed by evaporation.

A second method of polymerization consists in agitating the monomers in a liquid aliphatic hydrocarbon (which are non-solvents for vinylidene cyanide), for example, hexane or heptane, in the presence of a polymerization catalyst, whereupon the copolymer forms and may be separated from the polymerization medium by filtering or by evaporating the medium. It is important when using this method of polymerization that the liquid aliphatic hydrocarbon be free from impurities which initiate the ionic polymerization of vinylidene cyanide.

Alternatively, the polymerization may be carried out without the use of a solvent or other liquid medium for the monomers, that is, simply by heating and agitating a mixture of the monomers and polymerization catalyst. Also, the polymerization may be effected at temperatures as low as 0° C. or lower or as high as 100° C. or even higher provided a catalyst is utilized which will dissociate into free radicals at the polymerization temperature.

It is to be understood, of course, that regardless of the polymerization method utilized, the polymerization should be stopped before either of the monomers is entirely consumed, in order that an essentially 1:1 alternating copolymer will be obtained. Otherwise, when either of the monomers is completely used up, the product will contain straight polymer obtained by polymerization of the remaining monomer. Accordingly, it is often desirable to add, continuously or intermittently, fresh quantities of one or both of the monomers, and also of catalyst and solvent, if desired, to the polymerization mixture during the course of the polymerization, thus taking fullest advantage of the capacity of the equipment and in effect operating a continuous or semi-continuous process.

The catalyst which is used in the polymerization is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, and the like. In general, from .01 to .1% by weight of the catalyst is utilized, although smaller or larger amounts may be utilized if desired. By regulating the amount of the catalyst it is possible to control very accurately the molecular weight of the copolymer. For instance, to obtain a high-molecular weight copolymer, a small quantity of catalyst is used, while low-molecular weight copolymers are obtained by the use of large amounts of catalyst, as will be seen in the examples below.

The following examples illustrate the preparation of copolymers of vinylidene cyanide and vinyl esters of aliphatic monocarboxylic acids in accordance with this invention, but are not to be construed as a limitation upon the scope thereof, for there are, of course, numerous possible variations and modifications. In the examples all parts are by weight.

*Examples I to VI*

A series of four vinylidene cyanide-vinyl acetate copolymers are prepared by adding the monomers to benzene (except in Example II where no benzene is present), adding o,o'-dichlorobenzoyl peroxide as the polymerization catalyst and heating the resulting solution to about 45° C. whereupon polymerization occurs to form the 1:1 alternating copolymer. After 130 minutes the copolymer is removed by filtering. The charging rates of the monomers and catalyst, the percent nitrogen in the copolymer and the mole percentage of vinylidene cyanide in the copolymer are recorded in the following table:

|  | Ex. I | Ex. II | Ex. III | Ex. IV | Ex. V | Ex. VI |
|---|---|---|---|---|---|---|
| Parts Benzene | 2.8 | 0.0 | 3.3 | 12.24 | 1.1 | 1.3 |
| Parts Vinylidene Cyanide | 0.2 | 9.9 | 2.0 | 14.6 | 2.0 | 4.07 |
| Mole Percent Vinylidene Cyanide | 2.0 | 12.4 | 17.0 | 32.8 | 50.0 | 83.0 |
| Parts Vinyl Acetate | 11.0 | 77.5 | 11.0 | 33.0 | 2.2 | 0.88 |
| Mole Percent Vinyl Acetate | 98.0 | 87.6 | 83.0 | 67.2 | 50.0 | 17.0 |
| Parts Catalyst | 0.022 | 0.043 | 0.026 | 0.024 | 0.008 | 0.01 |
| Weight Percent Catalyst Per Monomers | 0.2 | 0.05 | 0.2 | 0.05 | 0.2 | 0.2 |
| Percent N in Copolymer | 16.05 | 16.50 | 16.87 | 17.4 | 18.4 | 19.97 |
| Mole Percent Vinylidene Cyanide in Copolymer | 47.0 | 48.5 | 49.0 | 50.8 | 54.0 | 58.00 |
| Conversion (Percent Based on Total Weight of Monomers Charged) | 2.7 | 6.4 | 3.1 | 35.0 | 8.6 | 4.6 |

Example VII

A vinylidene cyanide-vinyl acetate copolymer is prepared by polymerizing 1:1 molar quantities of the two monomers in a 20% benzene solution (based on total weight of monomers) using 0.05% o,o'-dichlorobenzoyl peroxide as the catalyst and maintaining the solution at a temperature of from 40°–50° C. during the polymerization period. After 3 hours the copolymer is filtered off and dissolved in dimethyl formamide, giving an intrinsic viscosity of 4.6 (at 0.391% concentration), demonstrating that the copolymer possesses a relatively high molecular weight.

A second copolymer is prepared by the same method except that 0.09% of catalyst is used. A 0.22% solution of this copolymer in dimethyl formamide gives an intrinsic viscosity of 2.90, showing that as the amount of catalyst is increased the molecular weight, as evidenced by intrinsic viscosity, is decreased. Both of the copolymers are determined by analysis to contain 50 mole percent of vinylidene cyanide, and soften at a temperature of 160° C.

When other vinyl esters of aliphatic monocarboxylic acids are substituted for vinyl acetate in the above examples, the copolymers obtained are also essentially 1:1 alternating copolymers having properties generally equivalent or even superior to the vinylidene cyanide-vinyl acetate copolymers. Likewise, when the polymerization is carried out according to the other methods described hereinabove, or using other of the peroxygen catalysts disclosed, excellent results are achieved. Moreover, when 90 mole percent vinylidene cyanide is charged, an essentially 1:1 alternating copolymer is again obtained.

The copolymers which are prepared according to this invention are characterized by being soluble in nitromethane, hot cyclohexanone, dimethyl formamide, tetramethylene sulfone, and a mixture of twenty percent dimethyl formamide and 80% acetone. They are insoluble in boiling acetone, boiling acetic acid, ethyl alcohol, ethyl ether, benzene, water, dioxane and chlorobenzene.

As disclosed hereinabove, the copolymers of this invention are extremely valuable in the preparation of solutions from which can be spun filaments of any desired size which exhibit a crystalline pattern when examined by X-rays and which possess unusually high tensile strengths, excellent resistance to the action of alkalis and acids, as well as many other advantageous properties. To illustrate the superior quality of filaments obtained from vinylidene cyanide-vinyl acetate copolymers, a 12% solution of a copolymer (analyzing 50.8 mole percent vinylidene cyanide) in dimethyl formamide is prepared, spun through a spinneret into a water bath and "hot stretched" by a method whereby the filament is stretched in a hot zone in a series of steps, a process disclosed in a copending application, Serial No. 113,018, filed August 29, 1949. The filament thus prepared has a high tensile strength (81,000 p. s. i.) low elongation at break and is neither acid nor alkaline sensitive. Also, the filament is not thermoplastic up to 210° C., has a density of 1.20 and exhibits extremely low shrinkage at 100° C. In addition to the use of dimethyl formamide as the solvent for the copolymer, other of the solvents listed in the foregoing paragraph may also advantageously be used. Also, since the copolymers of this invention are characterized by having a definite softening point, they may be melt spun and may be cast into excellent films.

Although specific examples of the invention have been herein described, it is not intended to limit the invention solely thereto, but to include all of the variations and modifications falling within the spirit and scope of the appended claims.

We claim:

1. A copolymer of monomeric vinylidene cyanide and a vinyl ester of an unsubstituted aliphatic monocarboxylic acid, said copolymer possessing essentially the structure

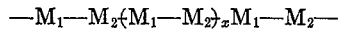

wherein each $M_1$ represents a vinylidene cyanide unit of the structure

each $M_2$ represents a unit of said vinyl ester of the structure

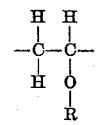

wherein R is the acyl radical of the said aliphatic monocarboxylic acid and $x$ represents a number, said copolymer being a resinous, heat-softenable solid which is soluble at room temperature in dimethyl formamide, but which is insoluble at room temperature in each of acetone, acetic acid, alcohol and ether, the monomeric vinylidene cyanide entering into said copolymer to produce the vinylidene cyanide units being a liquid at room temperature and a crystalline solid at 0° C. having a melting point when in purest form of substantially 9.0° to 9.7° C. and being characterized chemically by the ability to undergo on contact with water at room temperature an instantaneous homopolymerization reaction to give a solid water-insoluble resin.

2. The copolymer of claim 1 wherein the vinyl ester is a vinyl ester of an aliphatic monocarboxylic acid possessing the structure RCOOH, R being an alkyl radical containing from 1 to 6 carbon atoms.

3. The copolymer of claim 1 wherein the vinyl ester of an aliphatic monocarboxylic acid is vinyl acetate.

4. The method which comprises preparing a liquid medium containing liquid monomeric vinylidene cyanide, said monomeric vinylidene cyanide being characterizable chemically by the ability to undergo on contact with water at room temperature an instantaneous homopolymerization reaction to give a solid water-insoluble resin, admixing said liquid medium with a vinyl ester of an unsubstituted aliphatic monocarboxylic acid in an amount such that the mixture contains from 1 to 90 mol per cent of vinylidene cyanide and in the presence of a peroxygen catalyst, thereby to form a solid resinous copolymer of vinylidene cyanide and said vinyl ester, said copolymer possessing essentially the structure

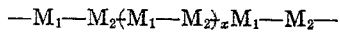

wherein each $M_1$ represents a vinylidene cyanide unit of the structure

each $M_2$ represents a unit of said vinyl ester and $x$ represents a number.

5. The method of claim 4 wherein the vinyl ester is a vinyl ester of an aliphatic monocarboxylic acid possessing the structure RCOOH, R being an alkyl radical containing from 1 to 6 carbon atoms, and the liquid medium containing monomeric vinylidene cyanide consists of monomeric vinylidene cyanide dissolved in an organic solvent which is inert thereto.

6. The method of claim 5 wherein the organic solvent is a liquid hydrocarbon.

7. The method of claim 6 wherein the vinyl ester is vinyl acetate, the liquid hydrocarbon solvent is benzene, and the peroxygen catalyst is o,o'-dichlorobenzoyl peroxide.

8. A synthetic filament comprising a copolymer of vinylidene cyanide and vinyl acetate, said copolymer possessing essentially the structure

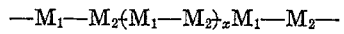

wherein each $M_1$ is a vinylidene cyanide unit, each $M_2$ is a unit of vinyl acetate and $x$ is a number, the vinylidene cyanide units being derived from the monomeric vinylidene cyanide which is a liquid at room temperature and a C. and being characterizable chemically by the crystalline solid at 0° C. having a melting point when in purest form of substantially 9.0 to 9.7° ability to undergo on contact with water at room temperature an instantaneous homopolymerization reaction to give a solid water-insoluble resin.

HARRY GILBERT.
FLOYD F. MILLER.

REFERENCES CITED

The following references are of record in the file of this patent:

UNITED STATES PATENTS

| Number | Name | Date |
|---|---|---|
| 2,466,395 | Dickey | Apr. 5, 1949 |
| 2,496,275 | Dickey | Feb. 7, 1950 |